A. MEINERT.
AUTOMATIC MACHINE FOR SELLING LIQUIDS.
APPLICATION FILED JAN. 27, 1908.

933,478.

Patented Sept. 7, 1909.
3 SHEETS—SHEET 1.

Witnesses
Chas. H. Smith
A. L. Serrell

Inventor
Anton Meinert
by Harold Serrell
his Atty

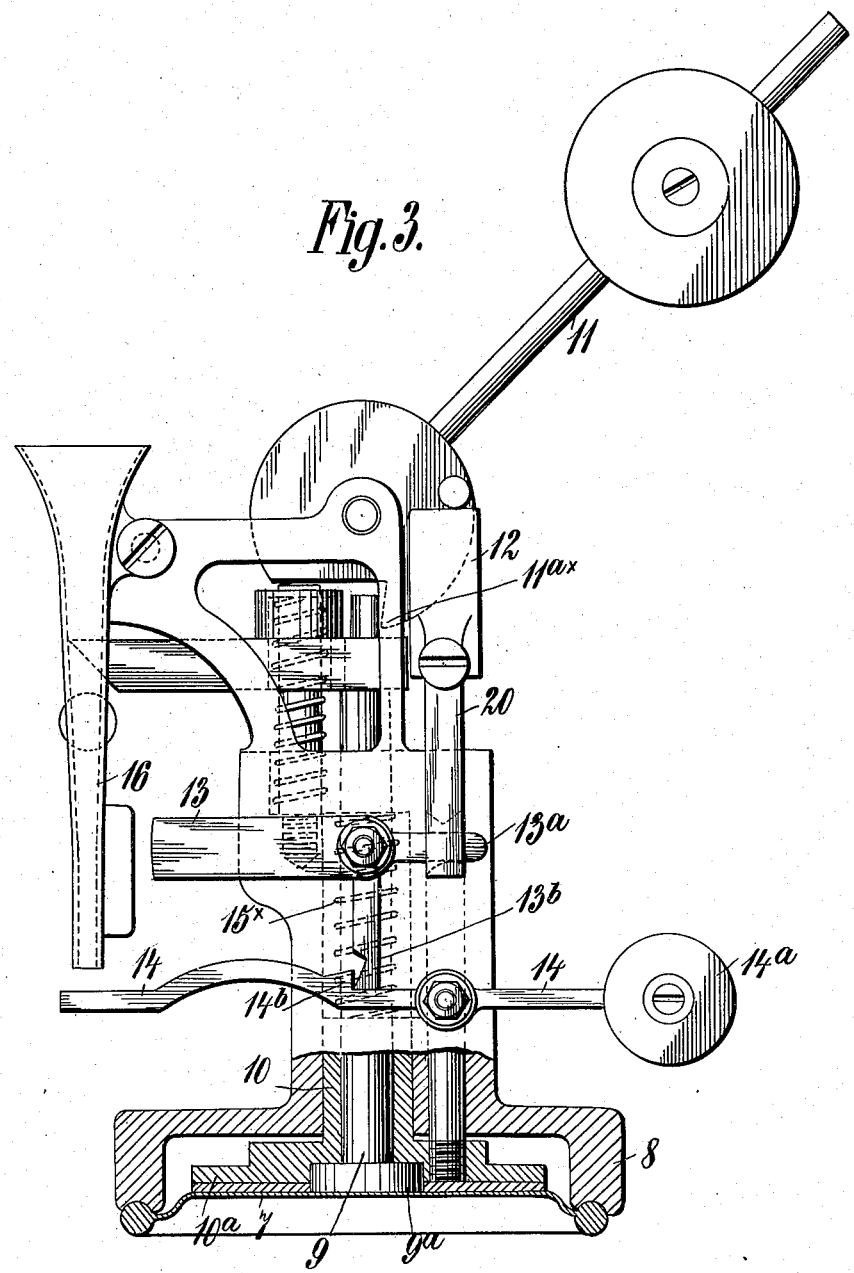

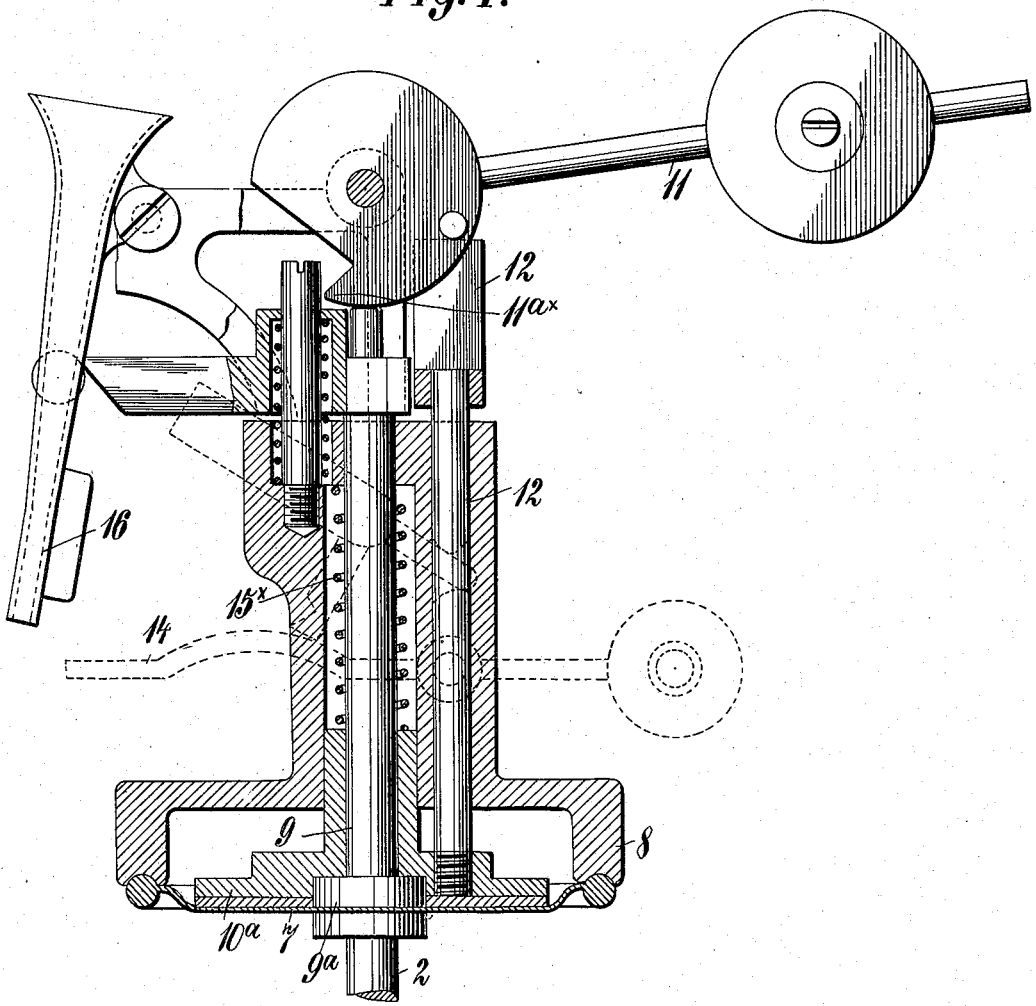

UNITED STATES PATENT OFFICE.

ANTON MEINERT, OF NECKARAU, NEAR MANNHEIM, GERMANY.

AUTOMATIC MACHINE FOR SELLING LIQUIDS.

933,478.  Specification of Letters Patent.  Patented Sept. 7, 1909.

Application filed January 27, 1908. Serial No. 412,787.

*To all whom it may concern:*

Be it known that I, ANTON MEINERT, a subject of the Grand Duke of Hesse, residing at 46 Schulstrasse, Neckarau, near Mannheim, Germany, have invented certain new and useful Improvements in Automatic Machines for Selling Liquids; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention relates to an automatic machine for selling liquids in which the inlet and outlet valves in the measuring receptacle are controlled by the coöperation of an air-outlet valve, which closes at a certain level of the liquid, and a diaphragm stretched by the pressure of the entering liquid. In accordance with the invention a driving member is arranged on which work is to be done by the diaphragm and which is to close the outlet and open the inlet for the liquid.

Figure 1:
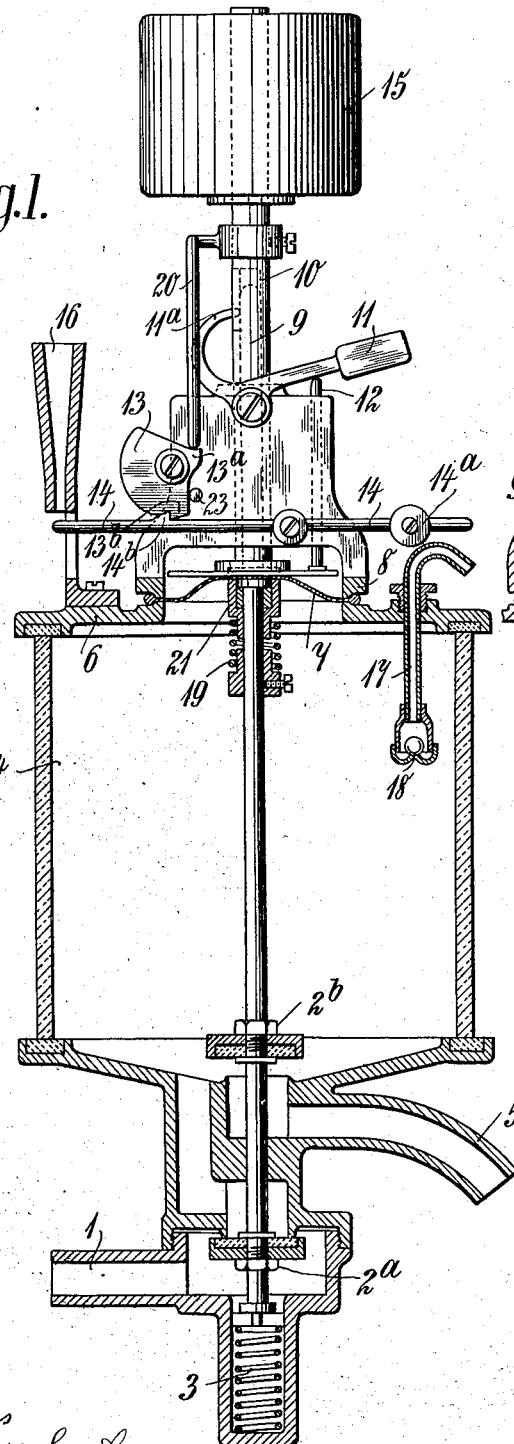
Figure 2:
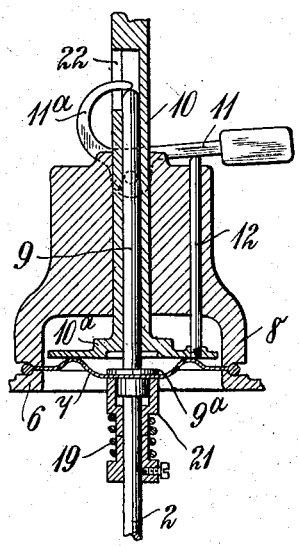

In order that the invention may be clearly understood reference is made to the accompanying drawings in which one embodiment is represented by way of example and in which:

Figure 1 is an elevation partly in section of a machine in its normal position corresponding to that when liquid flows out, and Fig. 2 is a vertical section through a detail in another position. Figs. 3 and 4 show a somewhat modified form in vertical section, the driving member being strained and in the position after its release by a coin respectively.

The measuring vessel 4 (Fig. 1) has an inlet 1 and an outlet 5 which are controlled by valves $2^a$ and $2^b$. The valves $2^a$ and $2^b$ are mounted in such a manner on a common spindle 2 that the one must be open when the other is closed. The valve-spindle 2 is under the action of a spring 3 which tends to close the valve $2^a$. In addition, the pressure of the liquid existing in the supply pipe 1 also acts on the valve $2^a$ in the closed position, tending to keep it closed.

The cover 6 of the vessel 4 has in its center a hole closed by a diaphragm 7. The latter is clamped air-tight between the rim round the hole in the cover, and the annular base of a pedestal 8. The diaphragm rests in the center on a socket 21 connected by means of a spring 19 with the valve-spindle 2. On the socket 21 and, when spring 19 is compressed, also on the upper end of the spindle 2 itself there is supported a pin 9 by means of its base-plate $9^a$ and by means of the diaphragm 7 situated between this base-plate and spindle. The pin 9 is surrounded by a hollow rod 10 guided in the pedestal 8; this rod is loaded by a driving member or weight 15 and runs out below into a broad plate $10^a$ resting on the diaphragm 7. With the plate $10^a$ there is connected a pin 12 extending upward and guided through a hole in the pedestal 8. On the upper end of this pin 12 there rests the weighted arm 11 of a two-armed lever which engages with its hook-shaped curved other arm $11^a$ in a slot 22 of the hollow rod 10 and according to the position of the pin 9 lies with its end against or engages over it.

On the pedestal 8 there is journaled a lever $13^a$, $13^b$ which under the action of a disk-shaped counterweight 13 tends to lie against a stop 23 limiting its movement. In the position shown in Fig. 1 the rod 10 with weight 15 is resting on the lever-arm $13^a$ by means of its support 20, so that the lever $13^a$, $13^b$ takes up the entire pressure of the weight, and the diaphragm and valve-spindle are unloaded. The lever $13^a$, $13^b$ is prevented from rotating by its arm $13^b$ lying against a nose $14^b$ of a locking lever 14. This engagement is assured by loading the lever 14 by means of a weight $14^a$. The locking lever 14 projects with its free end through the slotted mouthpiece 16 for the insertion of coins.

Through the cover 6 of the measuring vessel there passes a pipe 17 which carries at its interior end a floating ball-valve 18 and serves for conducting away the air expelled by the entering liquid and for the admission or air when the liquid is run off.

The described device operates as follows: If a coin or token is inserted into the mouthpiece 16 it hits the locking lever 14. The latter is thereby depressed and releases the lever $13^a$, $13^b$. Consequently the driving member or weight 15 with the rod 10 sinks, the lever $13^a$, $13^b$ rotating. The valve-spindle 2 is driven and the valve $2^b$ pressed on its seat, whereas the valve $2^a$ opens. Liquid now enters through the inlet 1 into the vessel 4, air escaping through pipe 17. With the weight 15 and the rod 10, the pin 9 has also fallen so far that the lever 11, 11ª, under the action of its load, could engage with the end of its hook-shaped curved arm 11ª over it (Fig. 2). In this manner the closure of the valve 2ᵇ is assured independently of the further pressure of the weight 15. When the level of the liquid in the vessel 4 has reached the floating valve 18, the ball of the latter is raised and closes the outlet. In this manner a pressure above that of the atmosphere arises in the vessel, under which the diaphragm 7 rises. As the pin 9 is held by the lever arm 11ª, only the rod 10 with the weight 15 at first participate in the rising movement of the diaphragm 7 (Fig. 2), so that the valve 2ᵇ still remains closed. The support 20 also descends with the rod 10, so that the lever 13ª, 13ᵇ can rotate counter-clockwise in the direction to the stop 23. Its arm 13ᵇ slides, pressing the lever 14 backward, over the nose 14ᵇ of the latter, which nose thereupon rises with the lever 14 and lies behind the arm 13ᵇ, so that it prevents the lever 13ª, 13ᵇ returning. At this moment the lever-arm 11 is also already raised by the pin 12 rising with the rod 10 so far that at the next moment the hook-shaped arm 11ª releases the pin 9. The valve-spindle 2 now also moves with the pin 9, the diaphragm 7 following under the action of the spring 3 and the pressure of the liquid acting on the valve 2ª. The latter is closed, the valve 2ᵇ opened and the liquid flows out of the vessel through the outlet 5, whereas air flows in through pipe 17. As soon as valve 2ᵇ is opened the pressure in the vessel 4 disappears. The diaphragm 7 remains however in the raised position under the pressure of the liquid and spring acting from below on the spindle 2, since the weight 15 exceeding this pressure is taken up by the lever 13ª, 13ᵇ. All the parts are now again in the commencing position (Fig. 1).

The automatic machine for selling liquids according to Figs. 3 and 4 differs from that according to Figs. 1 and 2 only in non-essential constructional details. Instead of the weight 15 there is a spring 15ˣ which is placed in a hole in the pedestal 8. Further, in consequence of the omission of the part of the rod 10 projecting above the pedestal 8, the support 20, by means of which the weighted lever 13ª, 13ᵇ takes up the pressure of the spring 15ˣ when the driving member is strained, is attached to the pin 12. Lastly, the lever 11, 11ª which prevents the center part of the diaphragm rising with the valve-spindle until the driving member is raised or strained by means of the outer part of the diaphragm, is also shaped somewhat differently. It has a cam 11ᵃˣ which is situated with its face concentric with the center of the lever 11 above the pin 9, and the pin 9 slides off from its sharp edge after the driving member has had work done on it through the diaphragm.

I claim as my invention:

1. In an automatic machine for selling liquids, a coin releasing mechanism comprising a coin chute, a locking lever, a counter weight on the same, a pivotally mounted counterweight, a stop for the same, means associated with the said locking lever for normally maintaining the said pivotally mounted counterweight against the said stop, a rod, and means whereby said rod is supported in its normal position by the said pivotally mounted counterweight when the latter is also in its normal position.

2. In an automatic machine for selling liquids, a coin releasing mechanism comprising a coin chute, a locking lever, one end of which passes beneath the bottom of the coin chute, a counterweight on the other end of said locking lever, a disk-shaped counterweight, a stop for the same, means associated with the said locking lever for normally maintaining the said disk-shaped counterweight against said stop, a rod, means for actuating the said rod and means whereby the said rod is supported in its normal position by the said disk-shaped counterweight against the action of the last aforesaid means.

3. In an automatic machine for selling liquids, a coin releasing mechanism comprising a coin chute, a locking lever, one end of which passes beneath the bottom of the coin chute, a counterweight on the opposite end of the said locking lever, a nose on the said locking lever, a pivotally mounted disk-shaped counterweight having a recess therein adapted to be engaged by the said nose on the locking lever, a stop for the said disk-shaped counterweight, a rod, a weight secured at one end of said rod for actuating the same, and a support arm secured to said rod and adapted to bear its free end against a portion of the said disk-shaped counterweight to support the said rod and weight in their normal positions when the said disk-shaped counterweight is in its normal position.

4. In an automatic machine for selling liquids, a coin releasing mechanism comprising a coin chute, a locking lever, one end of which passes beneath the bottom of the coin chute, a counterweight on the opposite end of the said locking lever, a nose on the said locking lever, a pivotally mounted disk-shaped counterweight having a recess therein adapted to be engaged by the said nose on the locking lever, a stop for the said disk shaped counterweight, a rod, a weight secured at one end of said rod for actuating the same, a collar surrounding said rod and adapted to be secured thereto, a support arm connected with said collar and adapted at its free end to bear against a portion of the said disk-shaped counterweight to maintain the said rod and its weight in their normal positions when the said disk-shaped counterweight is in its normal position in engagement with the said locking lever.

In testimony that I claim the foregoing as my invention, I have signed my name in presence of two subscribing witnesses.

ANTON MEINERT.

Witnesses:
CLARE ZAUER,
OTTO HARTING.